United States Patent [19]

Lewiner et al.

[11] 4,078,183

[45] Mar. 7, 1978

[54] CONTROL DEVICES OF THE RELAY TYPE

[75] Inventors: Jacques Lewiner, Saint-Cloud; Gérard Dreyfus, Villebon sur Yvette, both of France

[73] Assignee: Agence Nationale de Valorisation de la Recherche (ANVAR), France

[21] Appl. No.: 639,193

[22] Filed: Dec. 9, 1975

[30] Foreign Application Priority Data

Dec. 10, 1974 France .................. 74 40506

[51] Int. Cl.² .............................................. H01H 1/04
[52] U.S. Cl. ..................................... 307/112; 200/181
[58] Field of Search ............... 307/116, 117, 88 ET, 307/112; 317/DIG. 2, 144, 262 F; 179/111 E; 200/181

[56] References Cited

U.S. PATENT DOCUMENTS 3,553,364  1/1971  Lee ........................................ 178/7.3
3,942,029  3/1976  Kawakami et al. .............. 307/88 ET

OTHER PUBLICATIONS

IBM Technical Disclosure Bulletin, "Electrostatic Light Switch," Callahan, vol. 12, No. 6, Nov. 1969.

Primary Examiner—Robert K. Schaefer
Assistant Examiner—Morris Ginsburg
Attorney, Agent, or Firm—Brumbaugh, Graves, Donohue & Raymond

[57] ABSTRACT

The invention relates to devices of the relay type, but using an electrostatic force, rather than a magnetic force, for moving the mobile element. A device according to the invention allows to produce a modification in one or several controlled circuits under the control of a modification or order in an actuating or controlled circuit.

The device essentially includes two control electrodes, between which a potential difference may be applied (when desired) using an electrical power source and a control switch, and an electret constituted by an insulating element carrying electrical charges of opposite signs (negative and positive charges), the electret or the algebraic sum of which is different from zero; one of the electrodes is mobile and can occupy at least two positions.

The device may be applied to realize electrical, pneumatic, hydraulic or optical switchings.

19 Claims, 14 Drawing Figures

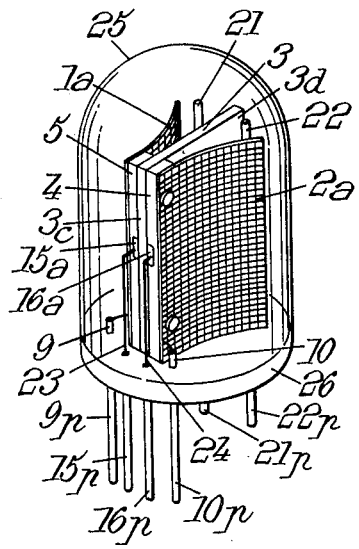
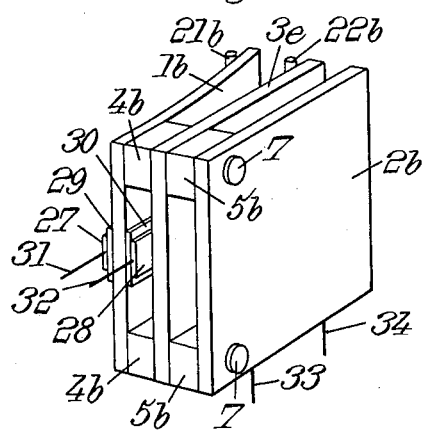
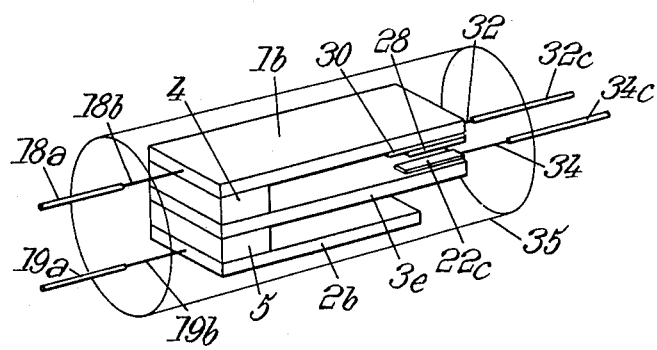
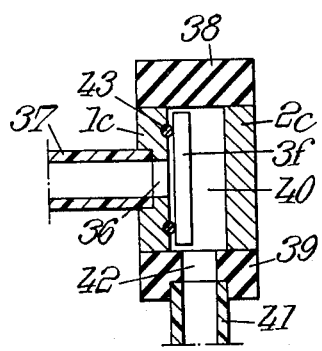
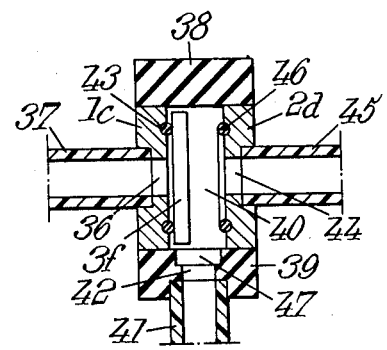

CONTROL DEVICES OF THE RELAY TYPE

The present invention relates to devices suitable for producing, in a first circuit or first circuits, a modification, under the control of a modification or order in a second conduit, the first circuit or currents being called "controlled circuit" and the second "actuating or control circuit."

The devices according to the invention are useful essentially, but not exclusively, for producing, on the one hand, electrical switchings when the controlled circuit is an electric circuit, and, on the other hand, hydraulic or pneumatic valves when the controlled circuit is a fluid circuit (liquid or gaseous). The controlled circuit may also be an optical circuit. In all cases the actuating or control circuit is electrical. More detailed explanations on the applications of the devices according to the invention will be given below, since they require a fuller knowledge of the structure and operation of these devices.

Prior art devices of the relay type are known, in which the electric control circuit generates a magnetic field which is generally produced in a coil which attracts or repels, when it is energised, a mobile metallic flap, this flap being able to occupy at least two positions so as to effect either the closing or the opening of one controlled circuit, or the closing or opening of two controlled circuits.

Such known relay devices are currently used to produce switching or electrical, pneumatic or hydraulic circuits. In the case of electrical circuits, these known relays enable the switching of electrical connections of high power in the controlled or load circuit, whilst consuming weak electrical actuating power in the control circuit; in the case of pneumatic or hydraulic circuits, the relays of known types enable the establishment of pneumatic or hydraulic switching in a pipe system of gas or of liquid whilst using also relatively weak electrical control power. However, in all cases the control circuit provides, at least for certain positions of the mobile flap, the closing of the electrical control circuit comprising the relay coil and consequently a permanent consumption, even if weak, of electrical current. It will be seen that on the contrary the device according to the invention does not require the closing of the control circuit and the consumption of current during certain periods of time.

Another drawback of the known relays is the fact that the mobile element or flap possesses a certain inertia due to the mechanical mounting of this element which is sensitive to the magnetic force produced by the relay coil.

Contrary to previous control devices bringing into play magnetic forces, the present invention relates to control devices of the relay type applying electrostatic forces resulting from the application of an electrostatic voltage to two control electrodes between which is positioned an electret, that is to say an insulating element carrying, on the one hand, positive electrical charges, and, on the other hand, negative electrical charges, relative displacement being produced between the electret and one of the electrodes (the electret or said electrode being mobile) according to the value of the electrostatic voltage between the two control electrodes and the charges borne by the electret.

More precisely the invention relates to a control device, of the relay type, comprising three mechanical elements of which one is mobile with respect to the two others, characterized by the fact that these three mechanical elements are constituted, on the one hand, by two control electrodes between which a predetermined potential difference can be applied, and on the other hand, an electret constituted by an insulating element carrying positive electrical charges and/or negative electrical charges, the algebraic sum of which is different from zero.

In a first embodiment, it is the electret which is mobile and can occupy two positions; according to the case, the relay can constitute either a make and break switch, the electret closing or opening the same electrical circuit respectively in the first or the second position thereof, or a selector or selection switch, the electret closing a first electrical circuit in a first position and a second electrical circuit in its second position.

In a second embodiment, it is one of the control electrodes which is mobile and, as in the preceding case, the relay can function as a make and break switch or as a selector switch, the control electrode, according to the position that it occupies, acting either on a single circuit, which is closed or opened, or on two circuits, which are closed, the one in the first position of the mobile electrode and the other in the second position of the mobile electrode.

In a third embodiment, the electret is mobile and it acts not to close or open electrical circuits, but to close or open pneumatic or hydraulic circuits, operating either as a make and break switch or as a selector switch. In the first case the electret, in its first position, interrupts the flow or circuit of the pneumatic or hydraulic fluid and, in its second position, establishes the flow or circuit. In the case of a selector switch, the electret, according to its position, establishes a first or a second pneumatic or hydraulic circuit.

In a fourth embodiment, the electret is again mobile and it acts this time on a light beam by directing the latter into a first or a second direction when the electret occupies respectively its first or its second position relatively to the control electrode, the light beam being able to form part of an optical circuit which is thus established or interrupted according to the position of the electret.

The control electrodes can be either flat or curved; they may be formed either by a solid plate of a metal which is a good conductor of electricity, such as brass, or formed from a metallic grid or from a sintered electrically conducting material.

The electret can be constituted by a film of polyimide, of polypropylene, of chlorotrifluoroethylene compounds (e.g. known under the names Aclar 33C and Aclar 22C), of polycarbonates, of halogenated polyhydrocarbons, such as fluorinated ethylene propylene ("Teflon FEP"), polytetrafluoroethylene (Teflon PTFE), of a thickness comprised between 1000 angstroms and 200 microns. These thicknesses may be obtained directly from the suppliers for films from 3 $\mu$ to 200 $\mu$ thickness. Below 3 $\mu$ they may be prepared, for example, by vacuum deposition (cathodic spraying). The electret can also be constituted from a mineral material (alumina for example) in which the electrical charges have been included, for example by ionic implantation, or in which conducting elements have been included and charged.

Each of the control electrodes carries or includes a conductor which permits connection to a control voltage source. In the case where the controlled circuit is constituted by one or several electrical circuits, the mobile element (electret or control electrode) carries or includes at least one contact (the latter being electrically insulated from the mass of the electrode when the electrode is the mobile element) which is adapted to close the controlled circuit or circuits.

The invention will, in any case, be well understood by means of the following additional description and accompanying drawings, which description and drawings are, of course, given by way of particular examples of embodiments.

FIG. 7 illustrates, in perspective, a second embodiment of the relay type device according to the invention in which the electret is also mobile and acts on two electrical circuits, the electrodes being constituted by curved grids.

FIGS. 8 and 9 show, in perspective, a third embodiment of the invention in which it is one of the electrodes which constitutes the mobile element, this electrode operating a selection between two electrical circuits in the case of FIG. 8 and effecting the closing or the opening of a single electric circuit in the case of FIG. 9.

FIGS. 10 and 11 illustrate a fourth embodiment of the invention, in which it is the electret which is the mobile element and acts on pneumatic or hydraulic circuits either as a single circuit make and break switch (FIG. 10), or as a selector switch for two circuits (FIG. 11), these two Figures being cross-sectional views.

Figure 13:
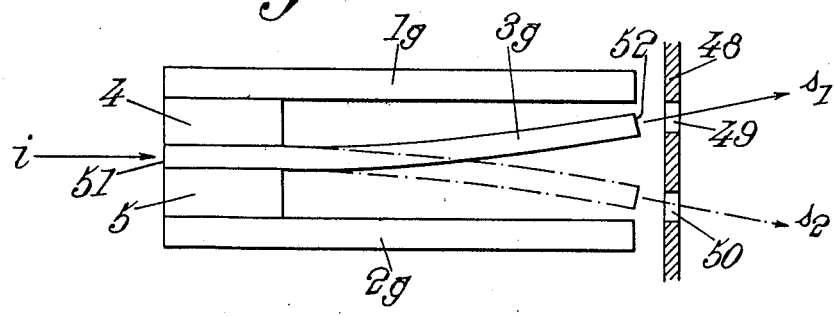
Figure 14:
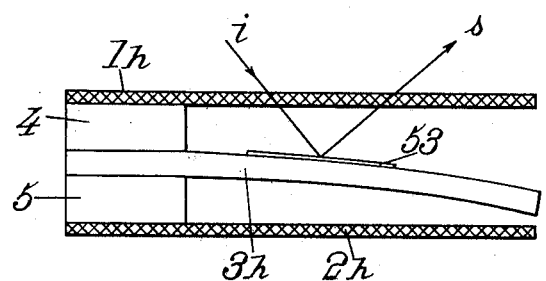

FIGS. 13 and 14, lastly, illustrate, in cross-section, a fifth embodiment of the invention, in which the electret is mobile and performs the deflection of a light beam.

According to the invention in order, for example, to realize a control device of the relay type applying electrostatic forces to perform the control of the mobile element, one operates as follows or in a similar manner.

Figure 1:
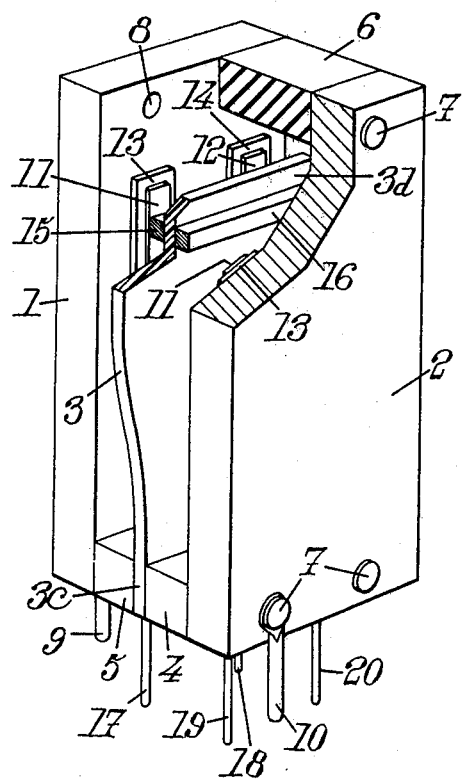
FIG. 1 illustrates in perspective, with a portion removed, a first embodiment of a device of the relay type according to the invention, in which it is the electret which is mobile and the latter acts on two controlled electrical circuits, the electrodes being constituted by flat plates.

A first embodiment is illustrated in FIG. 1. It comprises firstly two control electrodes 1 and 2, which are fixed and constituted by flat conducting plates, and a mobile electret 3, formed of insulating material and carrying, as illustrated in section in FIG. 2, positive charges and negative charges of respective surface densities $d_1$ and $d_2$ on the surfaces 3a and 3b respectively, the algebraic sum $d_1 + d_2$ ($d_2$ being given the $-$ sign) being different from zero. Insulating shims 4, 5 and 6 electrically separate the control electrodes 1 and 2, the mechanical assembly being effected by insulating screws 7 passing through holes 8 in electrodes 1 and 2 and similar holes formed in the electret 3 whose lower part 3c is clamped between shims 4 and 5, whilst the upper end 3d of the electret 3 can be moved between a first position close to the electrode 1 and a second position close to the electrode 2, as explained below.

As regards the electrical circuits, the latter are formed as follows:
the control circuit comprises two conductors 9 and 10, connected electrically to the electrode 1 and to the electrode 2 respectively;
the controlled circuits (the device in FIG. 1 acting as a selector switch) comprise, on the one hand, on each electrode 1 and 2, two conductors 11 and 12 electrically insulated from the corresponding electrode 1 or 2 by insulating layers 13 and 14 respectively, and, on the other hand, borne by each side of the mobile part 3d of the electret 3, two conductors or contacts 15 and 16, the conductor 15 being able to come into contact with the conductors 11 and 12 borne by the electrode 1, whilst the conductor 16 can come into contact with the conductors 11 and 12 borne by the electrode 2.

The manner in which the movement of the electret 3 between its two positions is controlled will be explained below. It will, however, be already easily understood that in its first position, in which the mobile upper end 3d of the electret adjoins the electrode 1, the conductor 15 closes the circuit between the conductors 11 and 12 borne by the electrode 1, which conductors are terminated by the conducting ends 17 and 18 respectively, whilst on the other hand, when the mobile upper end 3d of the electret 3 occupies its second position adjacent the electrode 2, the conductor 16 closes the circuit between the conductors 11 and 12 borne by the electrode 2 and which are terminated by the conducting ends 19 and 20 respectively.

Figure 2:
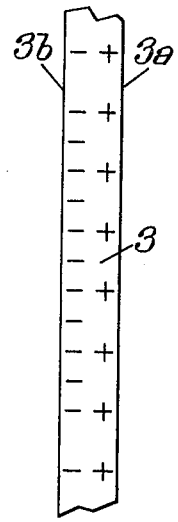
FIG. 2 is a partial and enlarged cross-section of the electret of FIG. 1 and illustrates the electrical charge distribution in this electret.

In the embodiment of FIGS. 1 and 2, the electrodes 1 and 2 are flat plates formed of a conducting material, for example of brass; they can be separated by a distance comprised between 10 microns and 10 cm. The electret 3 is constituted by an insulating film, for example a film of polyimide, of polypropylene, of compounds of chlorotrifluoroethylene (e.g., known under the names of Aclar 33C and Aclar 22C), from polycarbonates, from halogenated polyhydrocarbons, such as fluorinated ethylene propylene ("Teflon FEP"), polytetrafluoroethylene (Teflon PTFE), of thickness comprised between 1000 angstroms and 200 microns. These thicknesses can be obtained directly from the suppliers for films of 3 to 200 $\mu$ they can be prepared for example, by vacuum deposition (cathodic spraying). The electret can also be constituted by a mineral material (alumina for example) in which electrical charges have been included, for example by ionic implantation, or in which conducting elements have been included and charged.

The surface densities $d_1$ and $d_2$ can be comprised, in absolute value, between $10^{-11}$ coulomb/cm$^2$ and $10^{-5}$ coulomb/cm$^2$. Instead of using an electret charged by surface charges, it is possible to use an electret which has been charged in volume, or charged both on the surface and in volume. It is then necessary to satisfy the condition $d_1'$ and $d_2'$ different from zero where $d_1'$ and $d_2'$ are the imaginary surface charge densities which would produce the same electrical field outside the electret as the real charges which are placed therein.

The control voltage V applied between the electrodes 1 and 2 through the conductors 9 and 10 can be comprised, according to the distance between the electrodes 1 and 2 and the value of $d_1$ and $d_2$, or $d_1'$ and $d_2'$, between 1 volt and 10,000 volts. The conducting layers 15 and 16 must be sufficiently thick and wide and made of a good conducting metal so that the current which can be passed through these conducting layers does not produce by Joule effect excessive heating, which would reduce the useful life of the electret 3. In the same way, the contacts between the conductors 15 or 16, on the one hand, and 11 and 12, on the other hand, must be very good in order to avoid any unintentional heating. For this and in order to avoid oxidation, it may be helpful to envelop the whole system in a hermetic enclosure, which is either evacuated or filled with an inert gas.

Referring now to FIGS. 3 to 6, the operation of the electrostatic control relay of FIGS. 1 and 2 will now be explained. In FIGS. 3 to 6 are shown schematically the electrodes 1 and 2 and the electret 3 with the insulating shims 4, 5 and 6 and the input conductors 9 and 10 for the electrodes 1 and 2. These conductors 9 and 10 form part of an electrical circuit which also comprises voltage source S and a control switch I. In the initial state shown in FIG. 3, the mobile part 3d of the electret 3 is against the electrode 1 in its first position, this position constituting one of the two stable positions or the only stable position of the electret 3, which position is occupied when the switch 1 is open. When the switch I is closed (FIG. 4), the voltage source S applies a potential difference between the conductors 9 and 10 and hence between the electrodes 1 and 2. For reasons explained below, the mobile part of the electret 3 reaches its second position in the neighbourhood of the electrode 2, which position can be stable or astable.

Figures 3, 4, 5, 6:
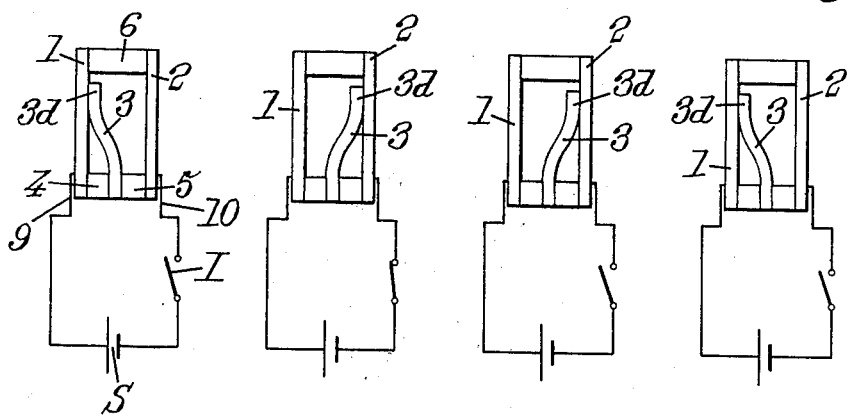
FIGS. 3 to 6 show the device of FIG. 1 diagrammatically for different positions of the control circuit switch and of the mobile electret.

When the switch I is opened (FIGS. 5 and 6), thereby discontinuing the application of a potential difference between the electrodes 1 and 2, two situations are possible:

a) the mobile part 3d of the electret 3 remains (FIG. 5) in the preceding position, that is to say, in the neighborhood of the electrode 2, which position is therefore stable;

b) on the other hand, the mobile part 3d of the elecetret 3 comes back (FIG. 6) into its initial position in the neighborhood of the electrode 1, the position of FIG. 4 then being astable.

It will thus be seen that, according to the situation, a device according to the invention can be of the bistable type (FIGS. 3, and 5) or of the monostable type (FIGS. 3, 4 and 6).

In FIG. 7 a second embodiment of the invention is illustrated, in which the control electrodes, instead of being conducting solid flat plates, are constituted by curved metallic grids, the electrodes then bearing the reference numerals 1a and 2a; as in the embodiment of FIGS. 1 and 2, the electrodes 1a and 2a are fed by conductors 9 and 10 respectively. In this embodiment only two insulating shims 4 and 5 are provided between which the fixed end 3c of the electret 3 is gripped. The mobile end 3d of the electret 3 can be moved between two positions; in the first position this mobile end 3d becomes applied against a conductor 21, whilst in its second position it becomes applied against a conductor 22 (in FIG. 7 the electret 3 has been shown during its passage from one position to the other). These conductors 21 and 22 cooperate respectively with conductors 15a and 16a, borne by the electret 3 and corresponding to the conductors 15 and 16 of the structure of FIGS. 1 and 2. In FIG. 7 the connecting wires 23 and 24 from the conductors 15a and 16a are also shown.

The structure which has just been decribed may advantageously be placed in a glass tube 25 borne by a support or base plate 26, the enclosure 25-26 being either evacuated or filled with an inert gas. From this enclosure emerge only the studs 9p and 10p from conductors 9 and 10, studs 21p and 22p from conductors 21 and 22 and studs 15p and 16p connected to conductors 15a and 16a by wires 23 and 24 respectively.

In the first position, when the mobile end 3d of the electret 3 is against the conductor 21, it is the circuit between the stud 21p and the stud 15p which is closed, although on the contrary when the mobile end 3d is in its second position against the conductor 22, it is the electrical circuit between the stud 22p and the stud 16p which is closed.

In the embodiments of FIGS. 1 and 2, on the one hand, and 7, on the other hand, to which correspond the diagrams of FIGS. 3 and 6, it is the electret 3, or more exactly its end 3d, which is mobile, this end acting as explained above to close either a first or a second electrical load circuit. In a modification, the device could serve as a make and break switch and, in this case, the electret 3d could only carry a single mobile conductor which, in a first position of the electret, would come into contact with another (fixed) conductor to close the only electrical load circuit, whilst in the second position of the electret the (mobile) conductor borne by the latter would no longer be in contact with the (fixed) conductor of the load circuit which would then be open.

In the third embodiment illustrated in FIGS. 8 and 9, it is no longer the electret which is mobile but one of the electrodes.

In the case of FIG. 8, the device includes two control electrodes 1b and 2b, the electrode 1b being mobile and the electrode 2b fixed, and a fixed electret 3e. Shims 4b and 5b fix the electret 3e in a position between the electrodes 1b and 2b, the assembly being held by insulating screws 7. The mobile electrode 1b can be moved between a first position, in which it comes into contact with a fixed conductor 21b, and a second position, in which it comes into contact with a fixed conductor 22b. This electrode 1b bears two (mobile) conductors 27 and 28 which are electrically insulated from the conducting electrode 1b by insulating layers 29 and 30 respectively. The conductors 27 and 28 are extended by output wires 31 and 32 respectively, whilst the conductors 21b and 22b are extended by output wires 33 and 34 respectively.

In its first position, the electrode 1b has the end of its conductor 27, opposite the wire 31, in contact with the conductor 21b and the circuit is hence closed between the wires 31 and 33. On the contrary, in the second position of the electrode 1b, it is the conductor 28 which is in contact with the conductor 22b and, consequently, it is the circuit between the wires 32 and 34 which is closed.

As in the case of FIG. 1, the electrodes 1b and 2b are supplied by (not shown) conductors.

The structure of FIG. 8 provides a selection switching by closing either the circuit 31, 33 or the circuit 32, 34. It is also possible, with a mobile electrode, to produce a simple make and break switch as illustrated in FIG. 9, in which are shown the fixed electrode 2b, the mobile electrode 1b, the electret 3e, the insulating shims 4 and 5, which play the same role as the insulating shims 4b and 5b of FIG. 8; the insulating screws 7 are not illustrated in FIG. 9.

A difference between the embodiment of FIG. 9 and that of FIG. 8 is the fact that the mobile electrode 1b only carries one conductor 28, insulated by a layer 30 from the mass of the electrode 1b which is conductive. The conductor 28 can come into contact or not, according to the position of the mobile electrode 1b, with a conductor 22c extended by a wire 34 terminated by a stud 34c, whilst the conductor 28 is extended by a wire 32 and a stud 32c.

When the electrode 1b is in the position shown in FIG. 9, that is to say in its upper position, the circuit is interrupted between the conductors 32 and 22c and consequently between the studs 32c and 34c. On the other hand, when the electrode 1b is attracted towards the electret 3e, the conductors 28 and 22c are in contact and the circuit is closed between the studs 32c and 34c. The device of FIG. 9 hence constitutes a switch controlled by the control studs 18a and 19a connected by wires 18b and 19b to the electrodes 1b and 2b respectively. The structure, except for the studs 18a, 19a, 32c, 34c, may be enclosed in an enclosure 35 which may be evacuated or filled with a non-oxidizing gas.

In the embodiments illustrated until now (FIGS. 1 and 2, FIG. 7, FIG. 8 or 9), the control of the motion of the mobile electret or of a mobile electrode has the effect of closing or of opening electrical circuits thereby realizing an electrical relay with electrostatic control. But the invention also applies to pneumatic or hydraulic switching, on the one hand, and to optical switching, on the other hand.

As regards firstly hydraulic or pneumatic switching, reference will be made to FIGS. 10 and 11 in which a device according to the invention plays respectively the role of a make and brake switch in a single fluid circuit or of a commutation switch between two fluid circuits.

In the case of FIG. 10, it is seen that the device comprises a first electrode 1c pierced by a hole 36 in which a tubing 37 for a liquid or gaseous fluid is fitted and a second solid electrode 2c. The two electrodes 1c and 2c are made of metal and are fixed; the define, with insulating parts 38 and 39, a chamber 40 in which an electret 3f of the aforesaid type may be removed. The chamber may communicate not only with the tubing 37 through the orifice 36, but also with a tubing 41 fitted into an orifice 42 formed in the insulating part 39. Lastly an O-ring 43 is provided against the surface of the electrode 1c which bounds the chamber 40. In FIG. 10 the conductors, connected to the electrodes 1c and 2c and enabling the application between the latter of the desired voltage differences, are not shown. In a first position of the mobile electret 3f, namely that illustrated in FIG. 10, the latter occurs in the vicinity of the electrode 1c against the O-ring 43 and thus prevents any communication between the tubing 37 and the tubing 41, the fluid circuit being hence interrupted; on the contrary, in its second position, the electret 3f is located against the electrode 2c and the fluid circuit is established between the tubings 37 and 41. It is therefore seen that the device of FIG. 10 forms a hydraulic or pneumatic flow make and break switch.

The device of FIG. 11 is similar to that of FIG. 10 (the same reference numerals are used in both Figures for corresponding elements), with the only difference that the second electrode, bearing the reference 2d, is also pierced by a hole 44 in which a tube 45 is fitted, the surface of the electrode 2d facing the chamber 40 being also provided with an O-ring 46. The mobile electret 3f can occupy two positions, i.e., a first one against the O-ring 43 of the electrode 1c and a second one against the O-ring 46 of the electrode 2d; in the first position, it is the fluid circuit between the tubes 45 and 41 which is established, whilst in the second position, it is the fluid circuit between the tubes 37 and 41 which is established.

It is hence seen that the device effects a selection between, on the one hand, the tube 41 and, on the other and, either the tube 37, or the tube 45; it constitutes therefore a selection switch.

To facilitate the operation of the device of FIG. 11, a slot 47 may be provided in the part 39.

If the fluid which flows in the system of tubes 37, 41 and 45 in the chamber 40, in the device of FIGS. 10 and 11, is corrosive to the electret, the latter may be protected as indicated in French Pat. No. 2,144,933 (Application No. 71,24291 filed July 2, 1971 by "Agence Nationale de Valorisation de la Recherche (ANVAR)."

Explanations will now be given as to why and how the mobile element (electrode or electret) is displaced, therein distinguishing between bistable operation and monostable operation.

Figure 12:
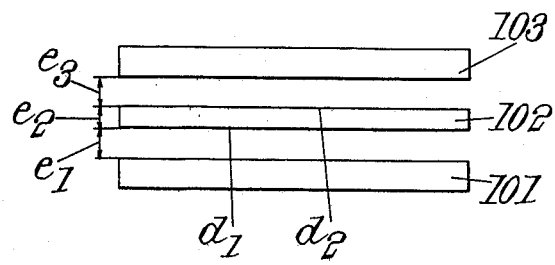
FIG. 12 illustrates diagrammatically a device according to the invention showing the different distances which come into play for establishing the operation of the device.

For this purpose reference is made to FIG. 12, in which a device according to the invention is shown very diagrammatically; said device comprises a first electrode 101, an electret 102 and a second electrode 103, the electret carrying, on its lower surface, an equivalent charge density $d_1$ and, on its upper surface, an equivalent charge density $d_2$. The distance between the electrode 101 and the lower surface of the electret 102 will be called $e_1$, the thickness of the electret 102 will be called $e_2$ and the distance between the upper surface of the electret 102 and the upper electrode 103 will be called $e_3$.

$d$ and $D$ will denote respectively the sum and the difference between the charges borne respectively by the lower surface and the upper surface of the electret.

One has therefore:

$$d = d_1 + d_2$$

$$D = d_1 - d_2$$

If the weight of the electret is neglected, the force whch is exerted on the electret amounts to:

$$F = \frac{S_o}{2L} d \left[ \frac{e_1 - e_3}{\epsilon_1} d - \frac{e_2}{\epsilon_2} D - 2V \right] \quad (1),$$

where $S_o$ is the area of the electret, $\epsilon_1$ is the dielectric constant of the media separating the electret from the electrodes, $\epsilon_2$ is the dielectric constant of the electret, $L = e_1 + (\epsilon_1/\epsilon_2) e_2 + e_3$, $V$ is the voltage applied between the electrodes 101 and 103.

When the electret is in contact with the lower electrode 101, one has $e_1 = 0$; when it is in contact with the upper electrode 103, one has $e_3 = 0$.

It is clear from (1) that if the sum $d$ of the charges borne by the electret is zero, the force is zero and consequently the device cannot operate.

When the thickness $e_2$ of the electret is small with respect to the distance $e$ between the electrodes, and when the operation is of the bistable type, the voltage which must be applied to switch the device from one state to the other is different from the voltage which must be applied to obtain the reverse transition, the difference between these two voltages being equal in absolute value, to $de/\epsilon_1$.

For example, if the quantities $d$, $D$ and $(e/\epsilon_1) d - (e_2/\epsilon_2) D$ are positive, it is necessary to apply a voltage less than $$V_1 = -\frac{1}{2}\left[\frac{e}{\epsilon_1} d + \frac{e_2}{\epsilon_2} D\right] \quad (V_1 < 0),$$

to cause the electret to pass from the upper position (in contact with the electrode 103) to the lower position (in contact with the electrode 101).

On the contrary, to make it return from the lower position to the upper position, a voltage greater than $$V_2 = \frac{1}{2}\left[\frac{e}{\epsilon_1} d - \frac{e_2}{\epsilon_2} D\right] \quad (V_2 > 0),$$

must be applied.

The choice of monostable or bistable operation depends on the dielectric constants of the media, on the thicknesses $e$ and $e_2$ and on the charge densities present in the electret. The following table shows the various possibilities of operation of the device.

|  | d | + | + | + | + | − | − | − | − |
|---|---|---|---|---|---|---|---|---|---|
|  | D | + | + | − | − | + | + | − | − |
| $\frac{e}{\epsilon_1} d - \frac{e_2}{\epsilon_2}$ | D | + | − | + | + | − | − | + | − |
| $-\frac{e}{\epsilon_1} d - \frac{e_2}{\epsilon_2}$ | D | − | − | + | − | + | − | + | + |
| Stable positions |  | 1 and 2 | 1 | 2 | 1 and 2 | 1 and 2 | 2 | 1 | 1 and 2 |
| Type of operation |  | B | M | M | B | B | M | M | B |

By position 1 is meant the lower position of the electret (if FIG. 12 is considered) and position 2 the upper position of the electret (still considering FIG. 12).

It will be noted, on consulting this table, on which monostable operation is indicated by M and bistable operation by B and positive and negative charges by + and − respectively, that monostable operation occurs each time that the third and fourth lines have the same sign and bistable operation when the third and fourth lines have different signs.

Under these conditions, it is possible to summarize the condition of monostable operation by the fact that the product $$-\left(\frac{e}{\epsilon_1} d - \frac{e_2}{\epsilon_2} D\right)\left(\frac{e}{\epsilon_1} D + \frac{e_2}{\epsilon_2} D\right)$$

is positive. On the contrary, if this product is negative, bistable operation will occur.

Considering that each of the two factors of the product comprises, the first, the difference, and, the second, the sum of the same two terms, it is possible to simplify and to write the condition as follows:
monostable operation if $$\left(\frac{ed}{\epsilon_1}\right)^2 - \left(\frac{e_2 D}{\epsilon_2}\right)^2 < 0$$

and bistable operation if this magnitude is on the contrary positive. Hence monostable if $$\left|\frac{e_2 D}{\epsilon_2}\right| > \left|\frac{ed}{\epsilon_1}\right|.$$

By way of illustration several examples will now be given of the conditions of operation of the device according to the invention.

EXAMPLE 1

The electret is constituted of fluorinated propylene ethylene sold by the Du Pont de Nemours Company under the trade name "Teflon FEP;" it has a thickness of 12.7 microns and a relative dielectric constant of 2.1. The film is charged by a corona discharge in air, the densities obtained being $1 nC/cm^2$, on one surface, and $-1.1 nC/cm^2$, on the other. The control electrodes are flat brass plates separated by 0.5 mm. Operation is then of the bistable type, the switching voltages amount to 21 V and − 36 V respectively. Operation can hence be insured by a voltage source of ± 40 V and requires no constant flow.

EXAMPLE 2

The electret is constituted of fluorinated propylene ethylene sold by the Du Pont de Nemours Company under the trade name "Teflon FEP;" it has a thickness of 254 $\mu$ and a relative dielectric constant of 2.1. The film is charged by an electron beam and a corona discharge, the densities obtained being 12.1 $nC/cm^2$, on one surface, and − 7.6 $nC/cm^2$, on the other; the electrodes are flat and separated by 1 mm. The operation is then of the monostable type, the switching voltages amounting respectively to + 260 V and +132 V. A pulse of 260 V is applied and the mobile electret moves to its astable position, and the voltage is then cut off.

EXAMPLE 3

The electret is constituted of polypropylene sold by the La Cellophane Company under the trade name "Maurylene." It has a thickness of 12 $\mu$ and a relative dielectric constant of 2. The film is charged by a corona discharge in air, the densities obtained being − 60 $nC/cm^2$, on one surface, and 55.7 $nC/cm^2$, on the other surface. The control electrodes are flat, made of brass and separated by 3 mm. Operation is of the bistable type. The control voltages are + 260 V and + 132 V respectively. Consequently it suffices to use a source of ± 3500 Volts.

EXAMPLE 4

The electret is constituted of polypropylene sold by La Cellophane Company under the trade name "Maurylene." It has a thickness of 12 $\mu$ and a relative dielectric constant of 2. The film is charged by corona discharge in air, the densities obtained being − 60 $nC/cm^2$, on one surface, and 55.7 $nC/cm^2$, on the other surface. The electrodes are flat steel grids, whose mesh is a square of 1 mm side, and separated by 3 mm. Operation is of the bistable type. The control voltages are respectively 1000 V and − 800 V. Consequently it suffices to use a source of ± 1000 volts.

EXAMPLE 5

The electret is constituted of polyethylene terephthalate sold by the La Cellophane Company under the tradename "Terphane." It has a thickness of 350 $\mu$ and a relative dielectric constant of 2. The film is charged by a corona discharge in air, the densities obtained being — 4.3 $nC/cm^2$, on one surface, and 3.2 $nC/cm^2$, on the other surface. The electrodes are flat steel grids, whose mesh is a square of 1 mm side, and separated by 0.8 mm. Operation is of the monostable type, the switching voltages amounting respectively to 1000 V and 200 V. 1000 V is applied to bring the relay into the astable position; the supply is cut off and falls back into its stable position.

EXAMPLE 6

The electret is constituted by polyethylene terephthalate sold by the La Cellophane Company under the trade name "Terphane." It has a thickness of 125 $\mu$ and a relative dielectric constant of 2. The film is charged by a corona discharge in air, the densities obtained being — 6.69 $nC/cm^2$, on one surface, and — 6.08 $nC/cm^2$, on the other surface. The control electrodes are flat brass grids, whose mesh is a square of 1 mm side, and separated by 3 mm. Operation is of the bistable type, the control voltages being — 800 V and 2100V. Consequently it suffices to use a source of ± 2200 volts.

Finally, referring to FIGS. 13 and 14, the manner in which the invention can be applied to produce switching of optical circuits will be explained.

In FIG. 13 two fixed flat metal electrods 1g and 2g and an electret 3g, with its insulating shims 4 and 5, are shown. Opposite the free end of the electrodes and of the electret is a plate 48 of a non-transparent material pierced by two slots 49 and 50. The electret 3g is formed of a material which is transparent and conducting with respect to the radiation used. The incident beam i of radiation arrives on the surface 51 of the electret 3g and it emerges through the surface 52 of the latter. According to the position of the electret 3g, the emergent beam occupies either the position $s_1$, by traversing the slot 49, or the position $s_2$, by traversing the slot 50. Switching in an optical circuit is thus effected.

In the case of FIG. 14, the fixed electrodes 1h and 2h are constituted each of a metallic grid. The electret 3h is mobile and it bears a reflecting surface 53 for the radiation. The incident beam i and the reflected or emergent beam s are shown. In this case the electret 3h gripped between the insulating shims 4 and 5 does not need to be transparent to the optical radiation. According to the position of the electret 3h, the emergent way or beam s occupies two different positions, one only having been shown in FIG. 14. With the device of FIG. 14 it is hence also possible to produce optical switching.

The device according to the invention has many applications due to the fact that it can be highly miniaturized, that its operation is very rapid and very reliable and that it does not require the consumption of current.

It can serve for produding electrical switching either of heavy currents (power switching) or of weak currents (telephone switching for example). It can also serve for producing circuit breakers or Schmidt trigger circuits since the two tiltings or switchings from one position to the other take place at different voltage levels under certain conditions, as explained above.

The device according to the invention can also serve for producing electrically controlled hydraulic or pneumatic valves. It can be used in low pressure fluid devices, since the mobile element is very small and extreme miniaturization can thus be realized.

Optical applications can also be realized, since the device according to the invention enables the deflection of light beam to be produced, for example for switching optical circuits.

Finally it is possible to produce mechanical oscillators applying the invention.

The invention is in no way limited to those of its types of applications and embodiments which have been more especially disclosed; it encompasses, on the contrary, all modifications thereof which may be easily realized by the persons skilled in the art.

Thus, the inert gas can advantageously be replaced by a fluid of high dielectric strength inside the enclosure in which the device is enclosed.

It is also possible for the device according to the invention to be arranged so that it can occupy not only two positions of stable and/or astable equilibrium, but a greater number of positions, discrete or not, according to the intensity of a resilient force acting on the mobile element and on the potential difference applied between the electrodes.

I claim:

1. Switch comprising:
   three elements, wherein at least one of said elements is mobile relatively to the two others of said elements and is able to occupy at least two rest positions, at least one of said rest positions being a stable rest position, and wherein said three elements are constituted by two electrodes and one electret consisting in an insulating part bearing positive and/or negative electric charges, the algebraic sum of which is different from zero, and;
   means for applying a potential difference between said electrodes.

2. Switch according to claim 1, characterized by the fact that the mobile element is constituted by the electret.

3. Switch according to claim 1, characterized by the fact that the mobile element is constituted by an electrode.

4. Switch according to claim 1, characterized by the fact that the mobile element bears at least one conductive element which cooperates with at least one fixed conductive element, said conductive element borne by the mobile element coming into contact with the fixed conductive element in one of the positions of the mobile element.

5. Switch according to claim 1, characterized by the fact that the mobile element closes, in at least one of its positions, at least one orifice of a tubing for fluid.

6. Switch according to claim 1, characterized by the fact that the mobile element can be traversed by a light beam.

7. Switch according to claim 1, characterized by the fact that the mobile element carries a reflecting surface for a light beam.

8. Switch according to claim 1, characterized by the fact that the electrodes are constituted of solid metallic parts.

9. Switch according to claim 1, characterized by the fact that the electrodes comprise metallic grids.

10. Switch according to claim 1, characterized by the fact that the electrodes are constituted of an electrically conducting sintered material.

11. Switch according to claim 1, characterized by the fact that the electrodes are flat.

12. Switch according to claim 1, characterized by the fact that the electrodes are curved.

13. Switch according to claim 1, characterized by the fact that it is arranged in a sealed enclosure.

14. Switch according to claim 1, characterized by the fact that said enclosure is evacuated.

15. Switch according to claim 1, characterized by the fact that said enclosure is filled with a fluid of high dielectric strength.

16. Switch according to claim 1, characterized by the fact that the electret bears charge densities which produce in the outside of the electret electrical fields having the value of the fields that would be produced by surface charge densities, called equivalent densities, comprised, in absolute value, between $10^{-11}$ and $10^{-5}$ C/cm$^2$.

17. Switch according to claim 1, characterized by the fact that the electret is formed of fluorinated ethylene propylene.

18. Switch according to claim 1, characterized by the fact that it has a bistable operation.

19. Switch according to claim 1, characterized by the fact that it has a monostable operation.

* * * * *

UNITED STATES PATENT OFFICE
CERTIFICATE OF CORRECTION

Patent No. 4,078,183          Dated March 7, 1978

Inventor(s)  Lewiner et al.

It is certified that error appears in the above-identified patent and that said Letters Patent are hereby corrected as shown below:

First page, second paragraph of ABSTRACT, line 6, delete "the electret or";
First page, second paragraph of ABSTRACT, line 7, after "zero;" insert --the electret or--;
Col. 1, line 31, "switching or" should read --switching of--;
Col. 3, lines 24 & 25, "embodment" should read --embodiment--;
Col. 4, line 45, after "200 $\mu$" insert --thickness. Below 3 $\mu$--;
Col. 5, lines 36-37, "elecetret" should read --electret--;
Col. 5, line 42, after "3," insert --4--;
Col. 5, line 64, "decribed" should read --described--;
Col. 7, line 35, "the define" should read --they define--;
Col. 7, line 37, "removed" should read --moved--;
Col. 8, line 8, after "45" insert --and--;
Col. 8, line 40, "whch" should read --which--;
Col. 8, line 51, "($\varepsilon_1/\varepsilon_2$)" should read --$\varepsilon_1/\varepsilon_2$--;
Col. 9, line 1, "(e/$\varepsilon_1$)" should read --e/$\varepsilon_1$--;
Col. 9, line 2, "(e$_2$/$\varepsilon_2$)" should read --e$_2$/$\varepsilon_2$--;

UNITED STATES PATENT OFFICE
CERTIFICATE OF CORRECTION

Patent No. 4,078,183        Dated March 7, 1978

Inventor(s) Lewiner et al.

It is certified that error appears in the above-identified patent and that said Letters Patent are hereby corrected as shown below:

Col. 10, lines 65-66, "terephthalete" should read --terephthalate--;
Col. 11, line 55, "produding" should read --producing--;
Col. 13, line 1, "claim 1" should read --claim 13--;
Col. 13, line 3, "claim 1" should read --claim 13--.

Signed and Sealed this

Twenty-second Day of August 1978

[SEAL]

Attest:

RUTH C. MASON
Attesting Officer

DONALD W. BANNER
Commissioner of Patents and Trademarks